Sept. 20, 1932.   P. BROSSE   1,878,670
PRINTING MACHINE FOR GOFFERED FILMS
Filed Dec. 11, 1928
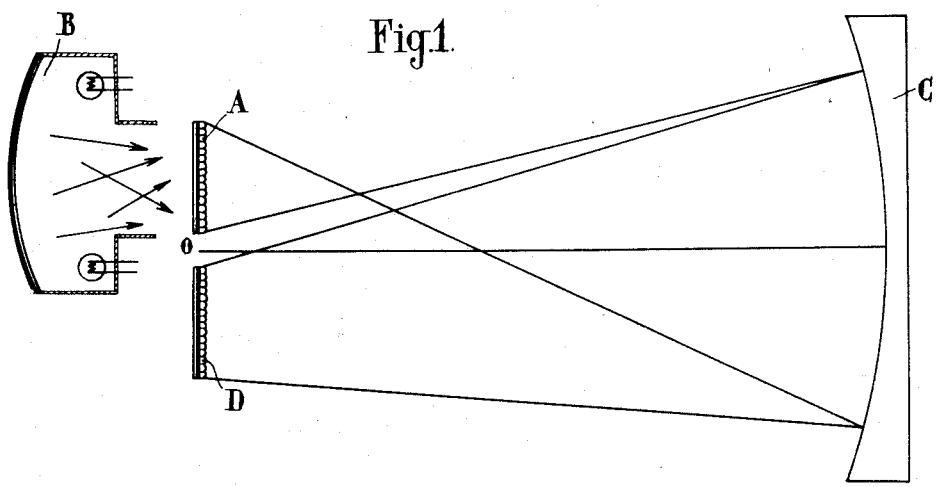
Fig.1.
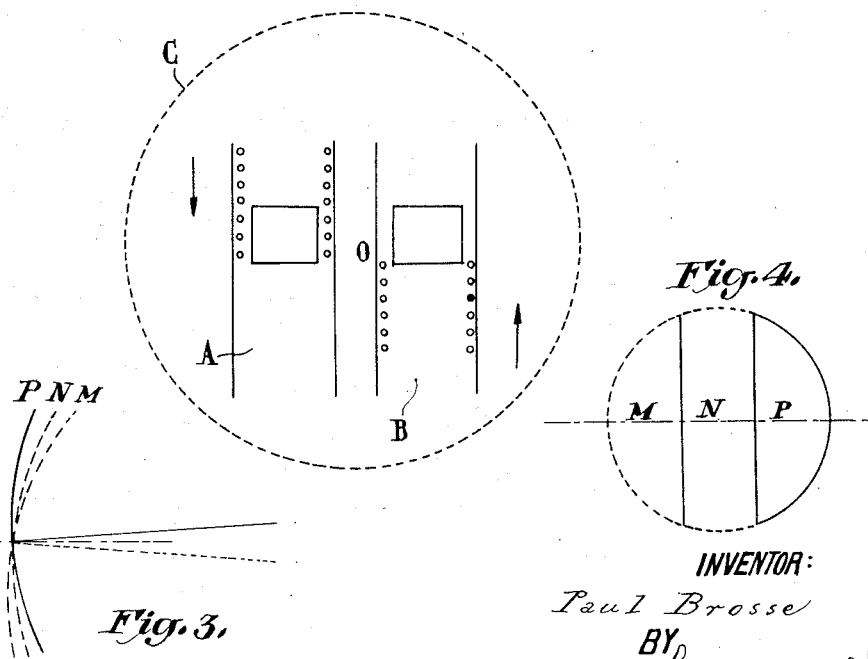
Fig.2.
Fig.3.
Fig.4.
INVENTOR:
Paul Brosse
BY
ATTORNEY Patented Sept. 20, 1932

1,878,670

UNITED STATES PATENT OFFICE

PAUL BROSSE, OF NEUILLY, FRANCE, ASSIGNOR, BY MESNE ASSIGNMENTS, TO KISLYN CORPORATION, OF NEW YORK, N. Y., A CORPORATION OF DELAWARE

PRINTING MACHINE FOR GOFFERED FILMS

Application filed December 11, 1928, Serial No. 325,359, and in France December 31, 1927.

The printing of ordinary films by projection of the original picture on sensitive film by means of a lens involves no special difficulties. By using a perfectly corrected lens, it has even been found that the prints thus obtained are of advanced quality as compared with prints obtained by the contact method.

Such is no longer the case when it is desired to print by the projection method pictures obtained on goffered film, that is, films whereof the backing surface is covered with linear miscroscopic refracting elements. In that case it is found that the brilliant objects on the original picture appear as surrounded by a kind of halation or fog, even though the image should be reproduced with absolute neatness and marked contrasts.

This fact is a consequence of the internal reflections which unavoidably take place in any lens. It is a known fact that when a lens illuminated by a punctual light source is considered obliquely, the image of the light point is seen as reflected on each face of the lens; and as any brilliant point of an image under projection may be considered as a punctual source, such point will thus produce partial reflections on the lens. It is easy to see that if the projection be effected on ordinary sensitive film, such partial reflections cannot have any objectionable effect upon the quality of the print; all that the weak radiations which are reflected in all directions are likely to produce is a slight uniform fog on the whole surface of the print, which fog is easy to counteract by using a suitable developer. It is an entirely different matter when the projection is effected upon goffered film, the goffering of which just faces the projecting lens. In that case, as each microscopic element of the backing acts as a microscopic linear or punctual lens, such element will take up the image or images of each reflex and will localize the same at particular points of the emulsion whenever the reflex is within the field of the refracting elements under consideration. Finally, those reflexes which are close to the normals to the various points of the copying film will be impressed upon the layer with an intensity proportional to their brilliancy; this explaining the halation or fog which appears around every brilliant point in prints on goffered film.

It is the object of this invention to entirely overcome such defect by substituting catoptric lenses for dioptric lenses in printing machines. In practice, a mere spherical mirror which is silver-plated and polished on the concave face thereof complies with the conditions necessary for a perfect print being obtained.

The working of such mirror and that of the printing machine as a whole are pointed out in the drawing appended hereto.

Figure 1 is a diagrammatic cross-sectional plan view of the printing machine, taken normally to the film and on the optical axis of the mirror; and Fig. 2 is an enlarged view showing both gates of the printing machine through which the original and sensitive films pass side by side.

Figs. 3 and 4 are side and front views of a modified form of mirror.

A is the goffered film to be duplicated;
B is a diffusion lamp illuminating film A;
C is a spherical mirror the optical center of which is at O;
D is a sensitive goffered film upon which mirror C projects the reversed image of film A.

The two films pass through the gates of the printing machine in such a manner that they both face mirror C with their goffered faces, but the original film A will be passed upwards while the blank film B will be passed downwards, as is the case in all usual types of projection printing machines.

The gates may be either exactly perpendicular to the optical axis of the mirror or slightly inclined thereto in order to more perfectly co-incide with the focal surface of the mirror adjacent to the vertex of that surface.

The center of curvature of the mirror must in all cases be located exactly between the two films in order to minimize the aberrations. Likewise, the radius of the mirror must be of such length that the long side of the pictures may be negligible relatively to said radius. Finally the diameter of the mirror must be such that its aperture related to its radius may be equivalent to the aperture of the lens used for the taking of the original picture (viz. generally 1/2.5).

The above device does not contemplate the elimination of waterings which is necessary if a correct print of the picture is to be obtained on goffered film. It is possible, however, according to French Patent No. 622,996, granted Feb. 11, 1926, to Rodolphe Berthon, to interpose in the paths of the beams to or from the mirror any one of certain optical devices which are contemplated to that end, but reflexes are introduced anew thereby. When films with linear nets are involved, the simplest arrangement consists in cutting the spherical mirror into three bands perpendicularly to the lines or striations of the net, and then to offset each of the three sections by the amount necessary to effect the elimination of the net of the original film.

It is further possible to deform the mirror by twisting it, especially if the latter be of metal construction (stainless steel, etc.). Such deformations and offsettings of the various zones of the mirror being infinitesimal, the sharpness of the resulting image is not altered.

An example of this arrangement is illustrated in Figs. 3 and 4 in which the three sections of the mirror are designated M, N, P; and it will be seen therefrom that the rays reflected by the individual sections are different, in consequence whereof the images formed thereby will not superpose in space.

The arrangement according to the invention consists in utilizing for the purpose of orienting, offsetting or distorting each of the three sections, angles sufficiently small that the lines of the net projected in space are reduced one third of their width. For instance, if the net comprises 30 lines per mm., the images formed by the three sections must be reduced 1/90 mm. with relation to one another, and it is apparent that in these conditions the image of the net will become confused or jumbled together.

Moreover, the twisting is effected in such a way that if, by hypothesis, the sections were made in practice and so arranged as to correspond to each of the three sections M—N—P, the curves thus obtained would be, respectively, the three curves M—N—P represented in Fig. 3.

I claim:

A machine for copying film having a backing formed with linear microscopic refracting elements by projection printing on similar sensitive film, comprising a pair of film gates, one for the original film and the other for the sensitive film and through which the two films pass side by side in opposite directions, a concave reflecting mirror at one side of said gates and the center of curvature of which lies exactly between the two films, said films having their goffered sides facing said mirror, a diffusing lamp at the other side of the gates for illuminating the original film from the back, said mirror being divided into a plurality of bands which are perpendicular to the linear refracting elements of the films, said bands being relatively offset to one another to an extent necessary to effect disappearance of the network of the original film in projection on the sensitive film and thereby avoid watering.

In testimony whereof I affix my signature.

PAUL BROSSE.